United States Patent
Sonoda et al.

(10) Patent No.: US 9,461,754 B2
(45) Date of Patent: Oct. 4, 2016

(54) OPTICAL RECEIVING APPARATUS, OPTICAL TRANSMITTER AND RECEIVER MODULE, AND OPTICAL TRANSMITTING AND RECEIVING APPARATUS

(71) Applicant: Fujitsu Optical Components Limited, Kawasaki-shi, Kanagawa (JP)

(72) Inventors: Hirohiko Sonoda, Sapporo (JP); Kohei Shibata, Isehara (JP); Takuya Nakao, Sapporo (JP); Yasuhiro Yamauchi, Sumida (JP); Ryuichi Yoshida, Kawasaki (JP); Hiroyuki Furukawa, Yokohama (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 35 days.

(21) Appl. No.: 14/498,077

(22) Filed: Sep. 26, 2014

(65) Prior Publication Data

US 2015/0117865 A1    Apr. 30, 2015

(30) Foreign Application Priority Data

Oct. 25, 2013   (JP) .................................. 2013-222656

(51) Int. Cl.
*H04B 10/06*   (2006.01)
*H04B 10/00*   (2013.01)
*G02B 6/12*    (2006.01)
(Continued)

(52) U.S. Cl.
CPC ...... *H04B 10/614* (2013.01); *H04B 10/07955* (2013.01); *G02B 6/42* (2013.01); *H04B 10/40* (2013.01); *H04B 10/615* (2013.01)

(58) Field of Classification Search
CPC .... H04B 10/40; H04B 10/615; H04B 10/61; H04B 10/0799; H04B 10/6166; H04B 10/614; H04B 10/28; H04B 10/43; G02B 6/42; G02B 6/4206; G02B 6/4214; G02B 6/4246; G02B 6/4212; H01L 2224/48091; H01L 2224/48137; H01L 2924/00; H05K 1/14; H05K 1/0274
USPC ............. 398/24, 37, 38, 204, 205, 208, 209, 398/159, 26
See application file for complete search history.

(56) References Cited

U.S. PATENT DOCUMENTS 5,787,215 A * 7/1998 Kuhara ................... H01L 31/12
                                                257/E31.095
5,960,135 A * 9/1999 Ozawa ................. G02B 6/4246
                                                385/14

(Continued)

FOREIGN PATENT DOCUMENTS

JP    2005-250178    9/2005

*Primary Examiner* — Ken N Vanderpuye
*Assistant Examiner* — Abbas H Alagheband
(74) *Attorney, Agent, or Firm* — Staas & Halsey LLP

(57) ABSTRACT

A housing accommodates an optical waveguide substrate, plural signal light receiving elements, and a signal-light-level monitoring light receiving element. Signal light and locally oscillated light are input into optical waveguides in the optical waveguide substrate from a first end face of the optical waveguide substrate. The plural signal light receiving elements are disposed aligned on a side of a second end face opposite to a side of the first end face of the optical waveguide substrate. The signal-light-level monitoring light receiving element is disposed on a side of a third end face or a fourth end face between the first end face and the second end face of the optical waveguide substrate and at a position closer to the first end face than to the second end face.

7 Claims, 8 Drawing Sheets

(51) Int. Cl.
  *G02B 6/28* (2006.01)
  *H04B 10/61* (2013.01)
  *H04B 10/079* (2013.01)
  *G02B 6/42* (2006.01)
  *H04B 10/40* (2013.01)

(56) References Cited

U.S. PATENT DOCUMENTS

| | | | | |
|---|---|---|---|---|
| 6,873,800 | B1 * | 3/2005 | Wei | G02B 6/4204 385/14 |
| 7,024,079 | B2 * | 4/2006 | Komiya | G02B 6/42 385/129 |
| 7,747,177 | B2 * | 6/2010 | Chen | H04B 10/6165 398/204 |
| 8,014,685 | B2 * | 9/2011 | Hoshida | H04B 10/61 398/152 |
| 9,020,337 | B2 * | 4/2015 | Tsubouchi | H04B 10/0799 398/204 |
| 9,020,367 | B2 * | 4/2015 | Jones | H04B 10/60 398/208 |
| 9,100,139 | B2 * | 8/2015 | Schmidt | H04J 14/0258 |
| 2004/0146304 | A1 * | 7/2004 | Kuhara | G02B 6/4206 398/138 |
| 2004/0179785 | A1 * | 9/2004 | Komiya | G02B 6/42 385/49 |
| 2007/0009212 | A1 * | 1/2007 | Martini | G02B 6/4201 385/92 |
| 2007/0036555 | A1 * | 2/2007 | Chen | H04B 10/6165 398/188 |
| 2010/0006784 | A1 * | 1/2010 | Mack | G02B 6/34 250/551 |
| 2012/0106984 | A1 * | 5/2012 | Jones | H04L 27/223 398/214 |
| 2013/0286847 | A1 * | 10/2013 | Schmidt | H04J 14/0276 370/241 |
| 2014/0023359 | A1 * | 1/2014 | Tsubouchi | H04B 10/0799 398/24 |
| 2015/0117865 | A1 * | 4/2015 | Sonoda | H04B 10/614 398/140 |

* cited by examiner

OPTICAL RECEIVING APPARATUS, OPTICAL TRANSMITTER AND RECEIVER MODULE, AND OPTICAL TRANSMITTING AND RECEIVING APPARATUS

CROSS REFERENCE TO RELATED APPLICATIONS

This application is based upon and claims the benefit of priority of the prior Japanese Patent Application No. 2013-222656, filed on Oct. 25, 2013, the entire contents of which are incorporated herein by reference.

FIELD

The embodiments discussed herein are related to an optical receiving apparatus, an optical transmitter and receiver module, and an optical transmitting and receiving apparatus.

BACKGROUND

Conventionally, in a multi-channel integrated light receiving circuit used in wavelength multiplexed optical communication, optical cross talk between channels is suppressed by disposing a light receiving element array on the side face of a planar optical circuit. Furthermore, optical cross talk between channels can suppressed by accommodating light receiving elements of the light receiving element array in a light blocking holder (see, e.g., Japanese Laid-Open Patent publication No. 2005-250178).

As a technique to realize large capacity optical communication, a coherent transmission technique has recently been present. In an optical receiving apparatus used in the coherent transmission technique, signal light and a locally oscillated light interfere with each other in an optical waveguide whereby, the signal light is amplified; and the amplified signal light is received by a light receiving element for signal light. Light branched from the signal light before interference with the locally oscillated light is received by a light receiving element to monitor the signal light level.

A portion of the high output locally oscillated light may be reflected by an end face of the optical waveguide and the light receiving element for signal light, thereby scattering and diverging in the optical waveguide and the housing before being received by the light receiving element for monitoring the signal light level. According to the technique of suppressing the optical cross talk among the channels in the traditional multi-channel integrated light receiving circuit, however, it is not assumed that the locally oscillated light is caused to be input into the optical waveguide and to interfere with the signal light. Therefore, cross talk light generated by the locally oscillated light cannot be prevented from being received by the light receiving element for monitoring the signal light level.

SUMMARY

According to an aspect of an embodiment, an optical receiving apparatus includes an optical waveguide substrate in which optical waveguides configured to transmit signal light and locally oscillated light therethrough, and optical 90-degree hybrid circuits configured to cause the signal light and the locally oscillated light to interfere with each other are formed; signal light receiving elements configured to receive the interfering signal light and locally oscillated light; a signal-light-level monitoring light receiving element configured to receive light branched from the signal light before interference with the locally oscillated light; and a housing that accommodates the optical waveguide substrate, the plurality of signal light receiving elements, and the signal-light-level monitoring light receiving element. The signal light and the locally oscillated light are input into the optical waveguides from a first end face of the optical waveguide substrate. The signal light receiving elements are disposed aligned on a side of a second end face that is opposite to the first end face of the optical waveguide substrate. The signal-light-level monitoring light receiving element is disposed on a side of a third end face or a fourth end face between the first end face and the second end face of the optical waveguide substrate and at a position closer to the first end face than to the second end face.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
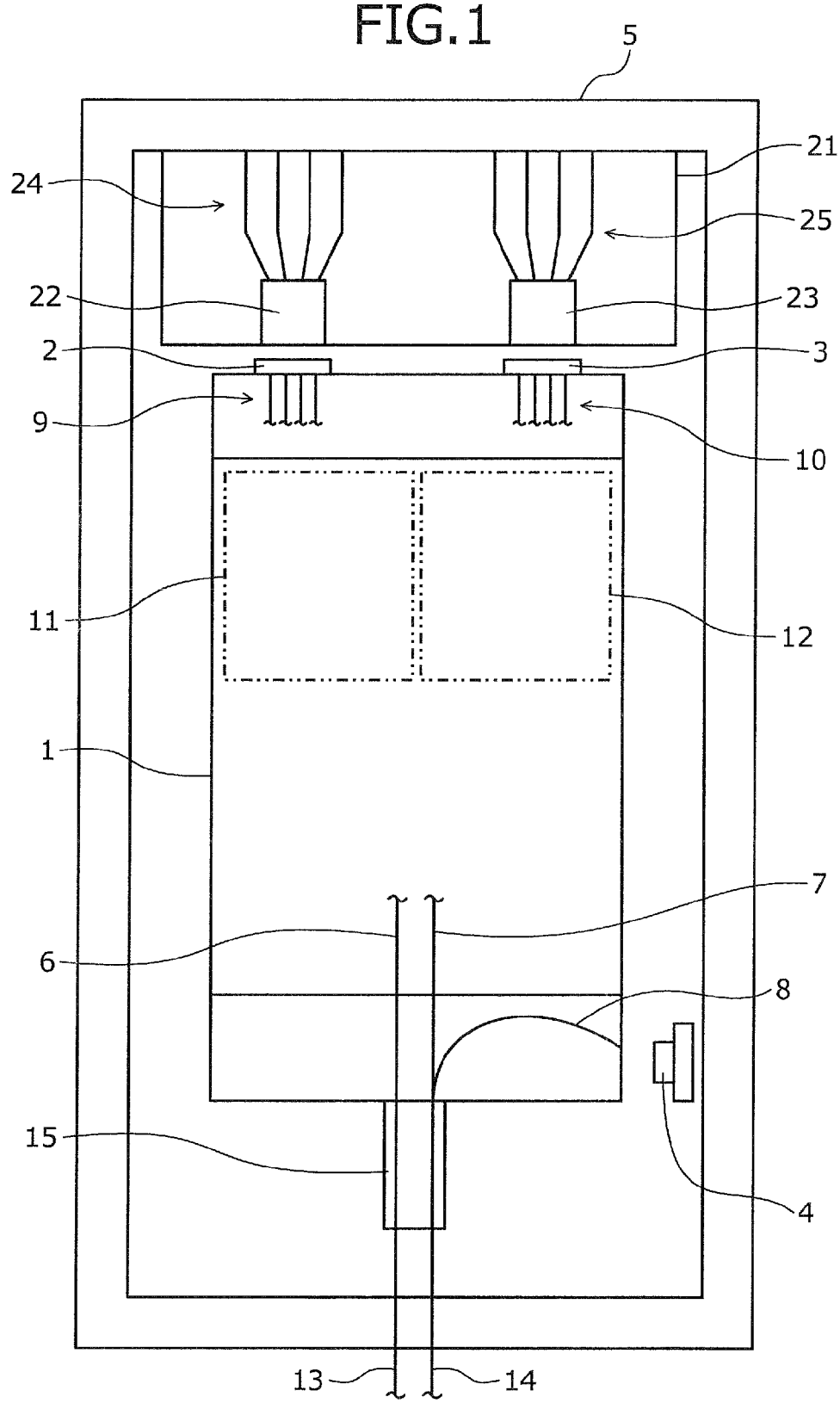
FIG. 1 is a diagram of an example of an optical receiving apparatus according to an embodiment.

Embodiments of an optical receiving apparatus, an optical transmitter and receiver module, and an optical transmitting and receiving apparatus will be described in detail with reference to the accompanying drawings. In the description of each of the embodiments, identical elements are given the same reference numerals and redundant description thereof is omitted.

FIG. 1 is a diagram of an example of an optical receiving apparatus according to an embodiment. As depicted in FIG. 1, the optical receiving apparatus includes an optical waveguide substrate 1, for example, two signal light receiving element arrays whose number 2 and 3, a signal-light-level monitoring light receiving element 4, and a housing 5. The housing 5 includes, for example, a main body including a bottom and having a box-like shape, and a lid. The optical waveguide substrate 1, the two signal light receiving element arrays 2 and 3, and the signal-light-level monitoring light receiving element 4 are accommodated in the main body of the housing 5 and, in this state, the main body is covered with the lid to be sealed. In FIG. 1, a state where the lid is opened is depicted.

The optical waveguide substrate 1 has optical waveguides 6 to 10 and optical 90-degree hybrid circuits 11 and 12 formed therein. In FIG. 1, patterns of the optical waveguides 6 to 10 are not depicted. The optical waveguide 6 transmitting the locally oscillated light is coupled to, for example, an optical fiber 13 to input the locally oscillated light into the optical waveguide substrate 1. The optical waveguide 7 transmitting the signal light is coupled to, for example, an optical fiber 14 to input the signal light into the optical waveguide substrate 1.

These optical fibers 13 and 14 into which the locally oscillated light and the signal light are input are, for example, guided into the interior of the housing 5 through an opening (not depicted) of the housing 5 from the exterior of the housing 5, and are supported by a block 15 made from, for example, glass. The guide-in portion of the housing 5 for each of the optical fibers 13 and 14 is sealed.

The optical waveguides 6 and 7 guide the locally oscillated light and the signal light to optical 90-degree hybrid circuits 11 and 12. Each of the optical 90-degree hybrid circuits 11 and 12 has a pattern of an optical waveguide formed therein to cause the signal light and the locally oscillated light to interfere with each other, and causes the signal light and the locally oscillated light to interfere with each other. The optical waveguide 9 guides the signal light amplified by the interference with the locally oscillated light in the one optical 90-degree hybrid circuit 11, to the one signal light receiving element array 2. The optical waveguide 10 guides the signal light amplified by the interference with the locally oscillated light in the other optical 90-degree hybrid circuit 12, to the other signal light receiving element array 3.

The signal light receiving element arrays 2 and 3 each receive the signal light respectively from the optical waveguides 9 and 10, and each converts the received signal light into an electronic signal. The optical waveguide 8 guides to the signal-light-level monitoring light receiving element 4, a portion of the signal light input from the optical fiber 14 into the optical waveguide substrate 1 and before the amplification in the optical 90-degree hybrid circuits 11 and 12. The signal-light-level monitoring light receiving element 4 receives the signal light from the optical waveguide 8 and converts the received signal light into an electronic signal. The level of the signal light is monitored based on the amount of current flowing in the signal-light-level monitoring light receiving element 4.

Of the optical waveguide substrate 1, an end face into which the locally oscillated light and the signal light are input from the optical fibers 13 and 14 will be referred to as "first end face"; an end face on the side opposite to that of the first end face will be referred to as "second end face"; two side faces between the first and the second end faces will be referred to as "third end face" and "fourth end face", respectively. The signal light receiving element arrays 2 and 3 are disposed on the second end face side of the optical waveguide substrate 1.

The signal-light-level monitoring light receiving element 4 is disposed on a side of the third end face or the fourth end face of the optical waveguide substrate 1 and with its light receiving face facing toward the end face on the side having the signal-light-level monitoring light receiving element 4 disposed thereon. The signal-light-level monitoring light receiving element 4 is disposed at a position closer to the first end face than to the second end face of the optical waveguide substrate 1.

A portion of the light passing through the optical waveguide substrate 1 and reaching the second end face thereof may be reflected by the second end face and diverge in the optical waveguide substrate 1 as scattering light. A portion of the light emitted from the second end face of the optical waveguide substrate 1 may be reflected by the light receiving faces of plural light receiving elements disposed on the signal light receiving element arrays 2 and 3, may enter the optical waveguide substrate 1 and diverge in the optical waveguide substrate 1 as scattering light. The optical waveguide substrate 1 may be made from a glass-based material and the scattering light diverging in the optical waveguide substrate 1 may laterally leak from the third and the fourth end faces out of the side to the optical waveguide substrate 1.

As depicted in FIG. 1, the housing 5 may accommodate, for example, an electronic processing unit 21 that processes the electronic signals output from the signal light receiving element arrays 2 and 3. The electronic processing unit 21 may have, for example, integrated circuits 22 and 23 disposed therein that each integrate therein a trans-impedance amplifier (TIA), a circuit executing automatic gain control (AGC), etc. Signals processed by the electronic processing unit 21 are output from the integrated circuits 22 and 23 to the exterior of the housing 5 using electric wires 24 and 25.

The optical receiving apparatus having the above configuration is applicable to, for example, a digital coherent receiving apparatus. A functional configuration will be described that is obtained when the optical receiving apparatus depicted in FIG. 1 is applied to the digital coherent receiving apparatus.

Figure 2:
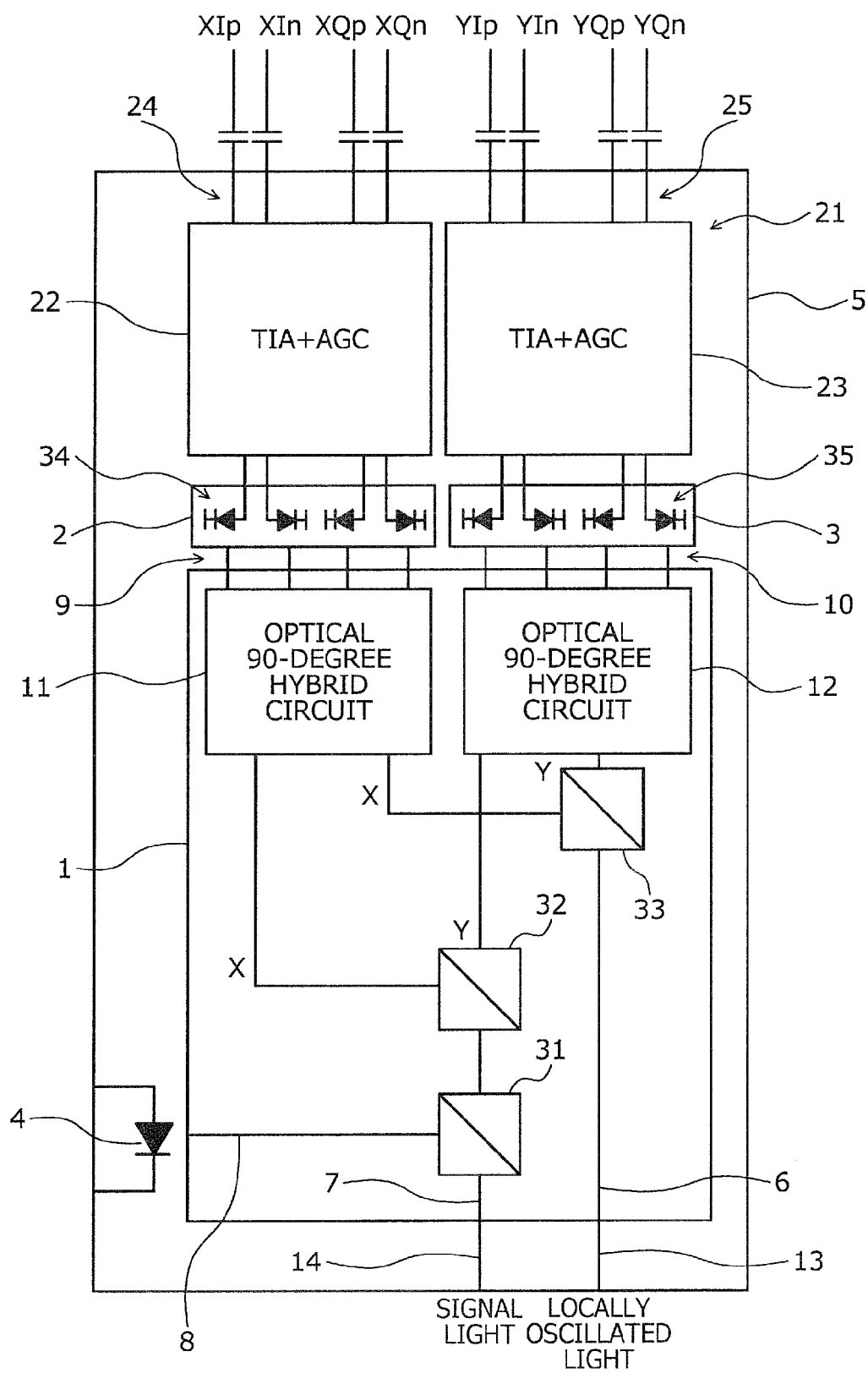
FIG. 2 is a diagram of an example of a functional configuration of the optical receiving apparatus depicted in FIG. 1.

FIG. 2 is a diagram of an example of a functional configuration of the optical receiving apparatus depicted in FIG. 1. As depicted in FIG. 2, in the optical waveguide substrate 1, a coupler 31 and a polarized wave separator 32 are inserted on the optical waveguide 7 and transmit the signal light input thereinto from the optical fiber 14. A 3-dB power coupler 33 is inserted on the optical waveguide 6 to transmit the locally oscillated light input thereinto from the optical fiber 13 therethrough.

The coupler 31 is coupled to the optical waveguide 8 extending toward the signal-light-level monitoring light receiving element 4. The coupler 31 branches the signal light input from the optical fiber 14 and outputs the branched signal light to the polarized wave separator 32 and the signal-light-level monitoring light receiving element 4. A photodiode is an example of the signal-light-level monitoring light receiving element 4.

The polarized wave separator 32 is coupled to the coupler 31 and the optical 90-degree hybrid circuits 11 and 12; separates the signal light passing through the coupler 31 into light of an X-polarized wave component and light of a Y-polarized wave component; and outputs the light of the X-polarized and the Y-polarized wave components to the optical 90-degree hybrid circuits 11 and 12, respectively.

The 3-dB power coupler 33 is coupled to the optical 90-degree hybrid circuits 11 and 12; branches the locally oscillated light into two branches, each having a half of the original power; and outputs the branched light to the optical 90-degree hybrid circuits 11 and 12 respectively for the X-polarized wave and the Y-polarized wave. When the locally oscillated light is the X-polarized wave light, the locally oscillated light is input into the optical 90-degree hybrid circuit 11 for the X-polarized wave, as the X-polarized wave and the light obtained by converting the locally oscillated light into the Y-polarized wave, is input into the optical 90-degree hybrid circuit 12 for the Y-polarized wave. When the locally oscillated light is the Y-polarized wave light, the above for the X-polarized wave light is inversely executed.

The signal light receiving element arrays 2 and 3 may respectively include plural, for example, four signal light receiving elements 34 and 35. A photodiode is an example of each of the signal light receiving elements 34 and 35. Photocurrent flowing in each of the signal light receiving elements 34 of the signal light receiving element array 2 for the X-polarized wave, is converted into a voltage signal and amplified by the trans-impedance amplifier and the automatic gain control in the integrated circuit 22 for the X-polarized wave. The integrated circuit 22 for the X-polarized wave outputs signals XIp and XIn each having an in-phase component of the X-polarized wave, and signals XQp and XQn each having an orthogonal component of the X-polarized wave.

Similarly, photocurrent flowing in each of the signal light receiving elements 35 of the signal light receiving element array 3 for the Y-polarized wave, is converted into a voltage signal and amplified by the trans-impedance amplifier and the automatic gain control in the integrated circuit 23 for the Y-polarized wave. The integrated circuit 23 for the Y-polarized wave outputs signals YIp and YIn each having an in-phase component of the Y-polarized wave, and signals YQp and YQn each having an orthogonal component of the Y-polarized wave.

Figure 3:
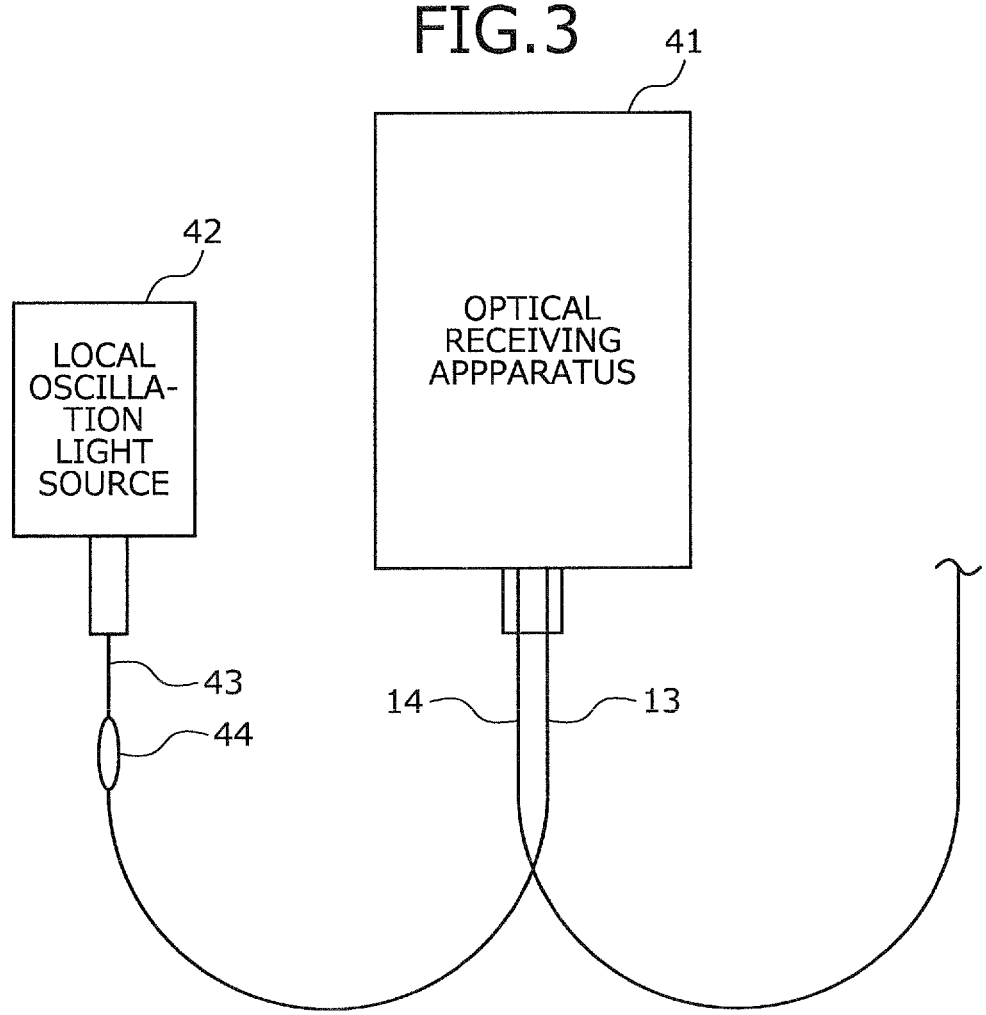
FIG. 3 is a diagram of an example of a state where a local oscillation light source is coupled to the optical receiving apparatus according to the embodiment.

FIG. 3 is a diagram of an example of a state where a local oscillation light source is coupled to the optical receiving apparatus according to the embodiment. In FIG. 3, the optical receiving apparatus 41 may be, for example, an optical receiving apparatus depicted in FIG. 1. In the optical receiving apparatus 41, the optical fiber 14 into which the signal light is input receives input of the signal light from an optical transmission path such as an optical fiber coupled thereto through a connector not depicted. The optical fiber 13 into which the locally oscillated light is input may be coupled by, for example, a splice 44 to an optical fiber 43 extending from the local oscillation light source 42 that outputs the locally oscillated light. The local oscillation light source 42 may be accommodated in the housing of the optical receiving apparatus 41.

According to the optical receiving apparatus depicted in FIG. 1 or 2, the signal-light-level monitoring light receiving element 4 is disposed on the third end face side or the fourth end face side of the optical waveguide substrate 1 and therefore, the light receiving face of the signal-light-level monitoring light receiving element 4 does not face, for example, the second end face of the optical waveguide substrate 1 or the light receiving faces of the signal light receiving elements 34 and 35 that all reflect light. Therefore, the light reflected by the second end face of the optical waveguide substrate 1 or the signal light receiving elements 34 and 35 has more difficulty in entering the signal-light-level monitoring light receiving element 4 than a case where the signal-light-level monitoring light receiving element 4 is disposed on the first end face side of the optical waveguide substrate 1. Therefore, any influence can be suppressed of the cross talk light generated by the locally oscillated light on the signal-light-level monitoring light receiving element 4. Thus, the level of the signal light can be measured high accuracy.

According to the optical receiving apparatus depicted in FIG. 1 or 2, the signal-light-level monitoring light receiving element 4 is disposed at a position closer to the first end face than the second end face of the optical waveguide substrate 1 and therefore, the distance between the second end face or the signal light receiving elements 34 and 35, and the signal-light-level monitoring light receiving element 4 is longer than a case where the signal-light-level monitoring light receiving element 4 is disposed at a position closer to the second end face. Thereby, for example, even when the light reflected by the second end face of the optical waveguide substrate 1 or the signal light receiving elements 34 and 35, returns and enters the signal-light-level monitoring light receiving element 4, the power of the light entering the signal-light-level monitoring light receiving element 4 is further attenuated. Therefore, any effects of the cross talk light generated by the locally oscillated light on the signal-light-level monitoring light receiving element 4 can be suppressed. Thus, the level of the signal light can be measured with high accuracy.

Figure 4:
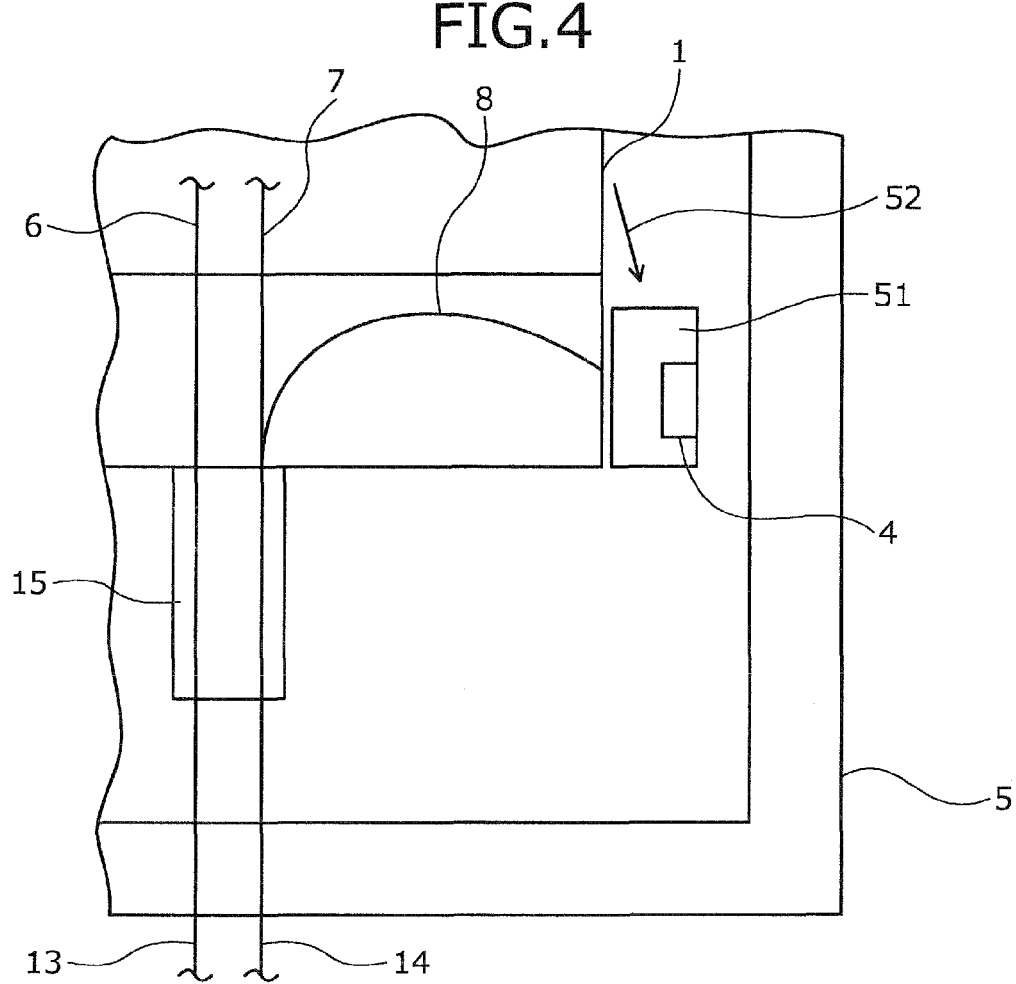
FIG. 4 is a diagram of a first example of a light blocking structure of the optical receiving apparatus according to the embodiment.

FIG. 4 is a diagram of a first example of a light blocking structure of the optical receiving apparatus according to the embodiment. As depicted in FIG. 4, the signal-light-level monitoring light receiving element 4 may be mounted on a carrier 51 having a light blocking property. The carrier 51 may cover the signal-light-level monitoring light receiving element 4 except, for example, the light receiving face of the signal-light-level monitoring light receiving element 4 that faces the optical waveguide substrate 1.

According to the optical receiving apparatus including the light blocking structure depicted in FIG. 4, for example, as indicated by an arrow in FIG. 4, the carrier 51 blocks light 52 leaking from the end face on the side having the signal-light-level monitoring light receiving element 4 disposed thereon of the optical waveguide substrate 1, from entering into the signal-light-level monitoring light receiving element 4. Thereby, even when the light reflected by the second end face of the optical waveguide substrate 1 or the signal light receiving elements 34 and 35 returns and leaks from the optical waveguide substrate 1, the signal-light-level monitoring light receiving element 4 does not receive the leaking light and therefore, any effects of the cross talk light generated by the locally oscillated light on the signal-light-level monitoring light receiving element 4 can be suppressed. Thus, the level of the signal light can be measured with high accuracy.

Figure 5:
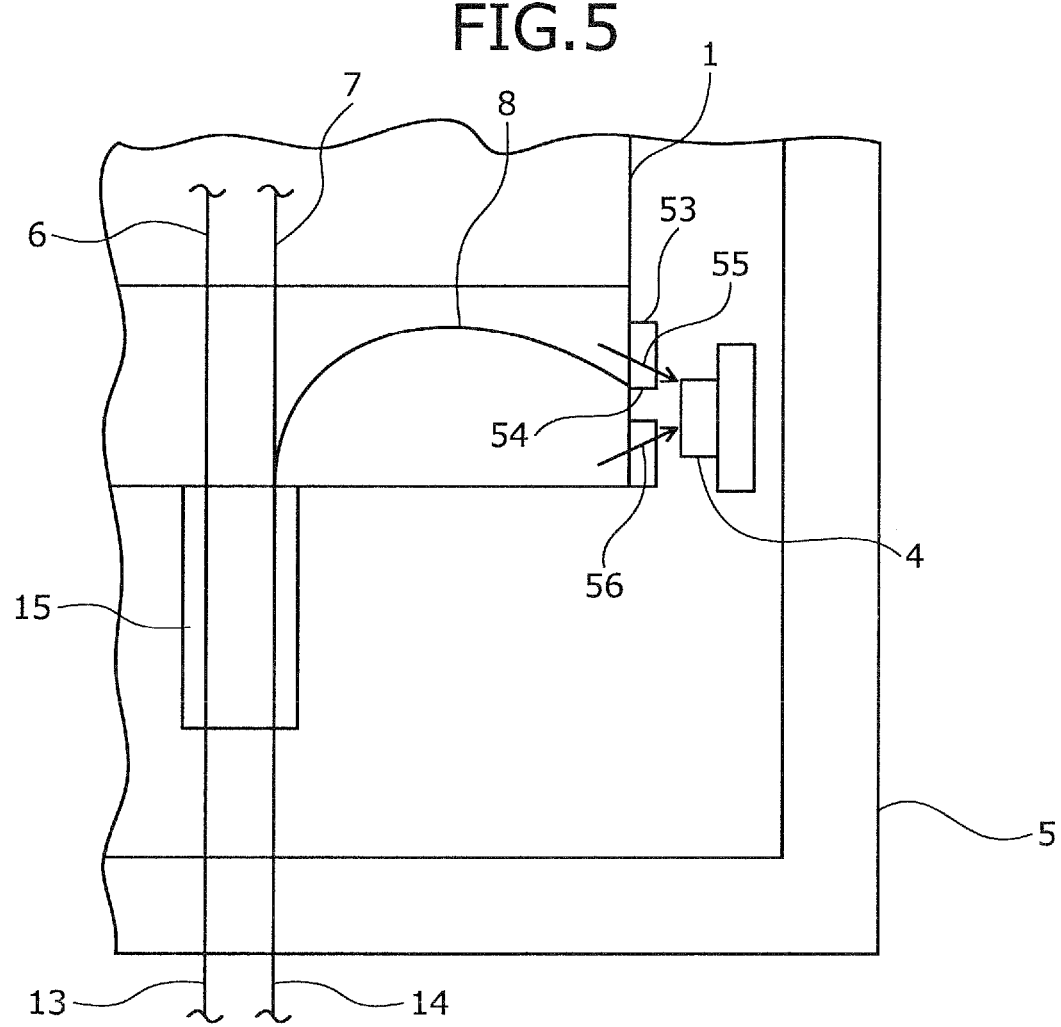
FIG. 5 is a diagram of a second example of the light blocking structure of the optical receiving apparatus according to the embodiment.

FIG. 5 is a diagram of a second example of the light blocking structure of the optical receiving apparatus according to the embodiment. As depicted in FIG. 5, a light blocking plate 53 may be disposed between the signal-light-level monitoring light receiving element 4 and the end face on the side having the signal-light-level monitoring light receiving element 4 disposed thereon of the optical waveguide substrate 1.

The light blocking plate 53 has a pinhole 54 made therein to transmit the light that enters from the optical waveguide 8, branched from the optical waveguide 7 transmitting the signal light therethrough, and extending toward the signal-light-level monitoring light receiving element 4. The light obtained by branching a portion of the signal light before the interference with the locally oscillated light passes through the pinhole 54 and is received by the signal-light-level monitoring light receiving element 4.

Preferably, the width of the pinhole 54 is equal to or wider than the width of the optical waveguide 8. The reason for this is that the light from the optical waveguide 8 can travel to the signal-light-level monitoring light receiving element 4 without being blocked by the light blocking plate 53. Preferably, the width of the pinhole 54 is equal to or narrower than, for example, 100 µm. The reason for this is that the amount of light entering the signal-light-level monitoring light receiving element 4 except the light from the optical waveguide 8 can be suppressed to be sufficiently small compared to the amount of light input into the signal-light-level monitoring light receiving element 4 from the optical waveguide 8.

According to the optical receiving apparatus including the light blocking structure depicted in FIG. 5, for example, as indicated by an arrow in FIG. 5, the light blocking plate 53 blocks light 55 and 56 leaking from the end face on the side having the signal-light-level monitoring light receiving element 4 disposed thereon of the optical waveguide substrate 1, from entering the signal-light-level monitoring light receiving element 4. Thus, even when the light reflected by the second end face of the optical waveguide substrate 1 or the signal light receiving elements 34 and 35 returns and leaks from the optical waveguide substrate 1, the signal-light-level monitoring light receiving element 4 does not receive the leaking light and therefore, any effects of the cross talk light generated by the locally oscillated light on the signal-light-level monitoring light receiving element 4 can be suppressed. Thus, the level of the signal light can be measured with high accuracy.

Figure 6:
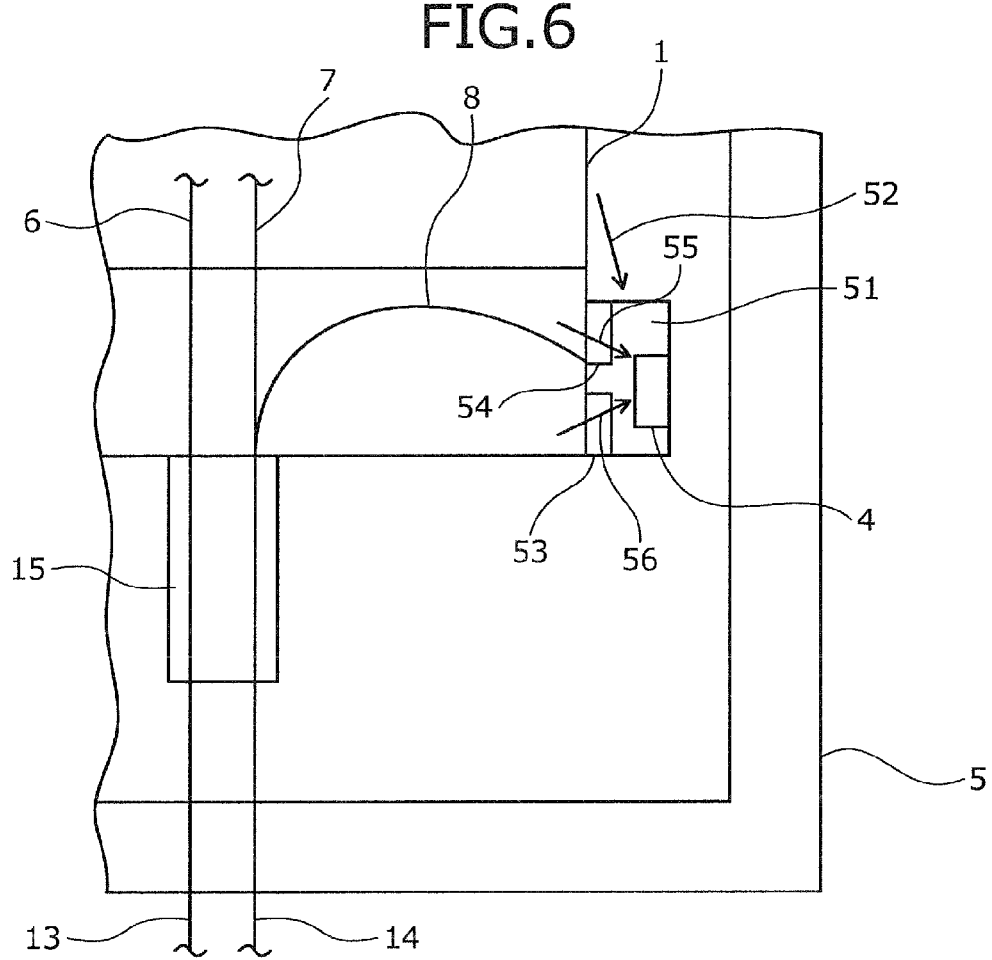
FIG. 6 is a diagram of a third example of the light blocking structure in the optical receiving apparatus according to the embodiment.

FIG. 6 is a diagram of a third example of the light blocking structure in the optical receiving apparatus according to the embodiment. As depicted in FIG. 6, the first example of the light blocking structure depicted in FIG. 4 and the second example thereof depicted in FIG. 5 may be combined with each other. The signal-light-level monitoring light receiving element 4 may be mounted on the carrier 51 having the light blocking property and the light blocking plate 53 having the light blocking property may be disposed between the signal-light-level monitoring light receiving element 4 and the end face on the side having the signal-light-level monitoring light receiving element 4 disposed thereon of the optical waveguide substrate 1.

According to the optical receiving apparatus including the light blocking structure depicted in FIG. 6, similar to the first example of the light blocking structure depicted in FIG. 4 and the second example thereof depicted in FIG. 5, any effects of the cross talk light generated by the locally oscillated light on the signal-light-level monitoring light receiving element 4 can be suppressed. Thus, the level of the signal light can be measured with high accuracy.

Figure 7:
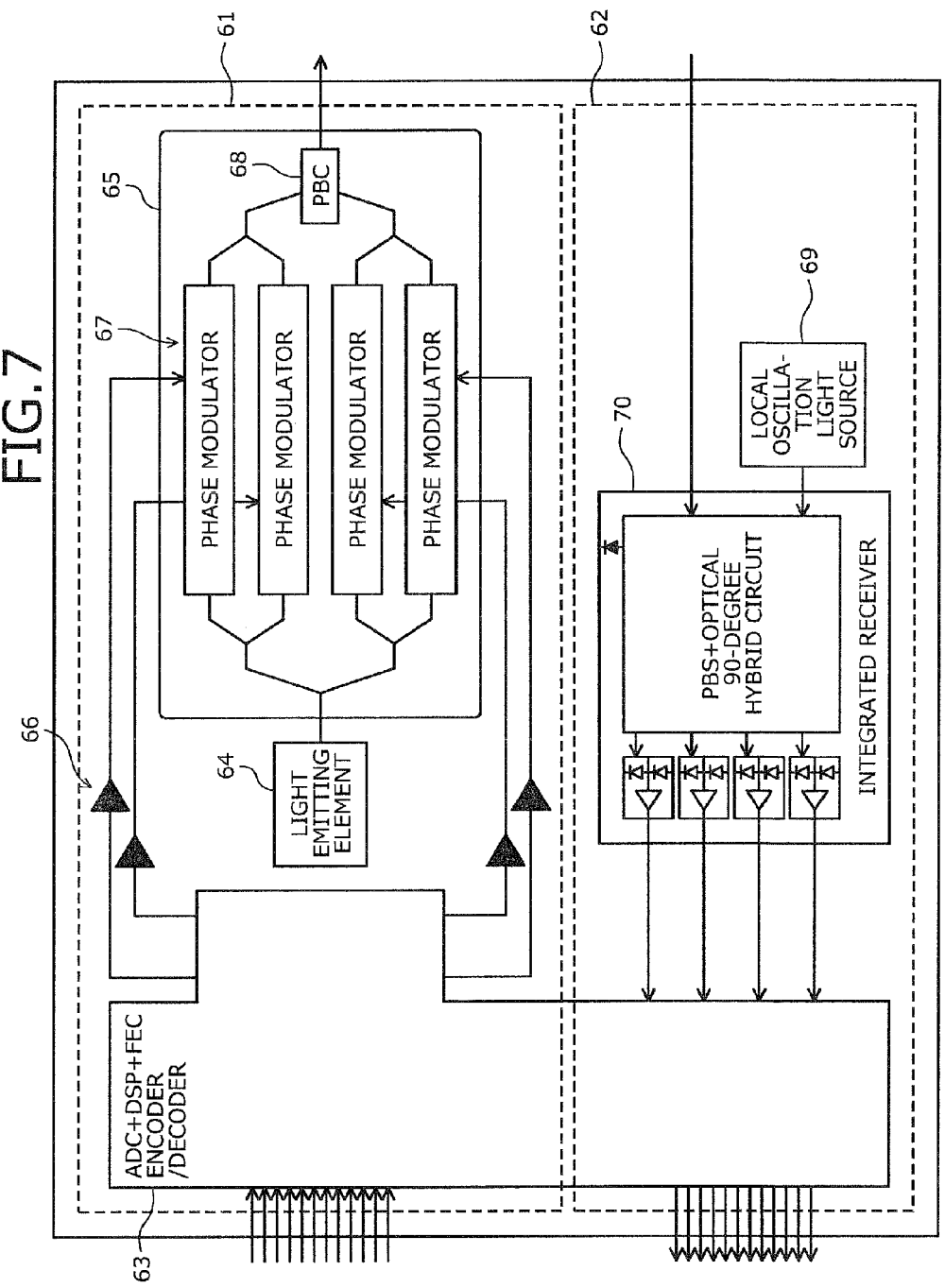
FIG. 7 is a diagram of an example of an optical transmitter and receiver module according to the embodiment.

FIG. 7 is a diagram of an example of an optical transmitter and receiver module according to the embodiment. As depicted in FIG. 7, the optical transmitter and receiver module includes an optical transmitting apparatus 61, an optical receiving apparatus 62, and an integrated circuit 63. The integrated circuit 63 may be used, for example, commonly for the optical transmitting apparatus 61 and the optical receiving apparatus 62, and may include an analog digital converter (ADC), a digital coherent signal processing (DSP) integrated circuit, and an encoder/decoder circuit for forward error correction (FEC).

The optical transmitting apparatus 61 includes a light emitting element 64, an optical modulator 65, and a modulator driving circuit 66. The light emitting element 64 emits light to be a transmission signal. A variable wavelength laser is an example of the light emitting element 64. The optical modulator 65 includes plural, for example, four phase modulators 67 and a polarization beam combiner (PBC) 68; and modulates the light emitted from the light emitting element 64. The modulator driving circuit 66 drives the phase modulators 67 based on a signal obtained by processing by the integrated circuit 63 data delivered from an application not depicted. The polarization beam combiner 68 combines the polarized components of the signal light output from the phase modulators 67. The optical transmitting apparatus 61 outputs the signal light combined by the polarization beam combiner 68.

The optical receiving apparatus 62 includes a local oscillation light source 69, an integrated receiver 70, and an integrated circuit 63. The local oscillation light source 69 emits locally oscillated light. The variable wavelength laser is an example of the local oscillation light source 69. The integrated receiver 70 includes a signal-light-level monitoring light receiving element; a coupler; a polarization beam splitter (PBS); a 3-dB power coupler; an optical 90-degree hybrid circuit; a light receiving element such as a photodiode; a trans-impedance amplifier; an automatic gain control circuit; etc. The integrated receiver 70 includes, for example, the optical receiving apparatus depicted in FIG. 1 or 2, or the optical receiving apparatus including the light blocking structure depicted in any one of FIGS. 4 to 6.

According to the optical transmitter and receiver module depicted in FIG. 7, similar to the optical receiving apparatus depicted in FIG. 1 or 2, or the optical receiving apparatus including the light blocking structure depicted in any one of FIGS. 4 to 6, any effects of the cross talk light generated by the locally oscillated light on the signal-light-level monitoring light receiving element can be suppressed. Thus, the level of the signal light can be measured with high accuracy.

Figure 8:
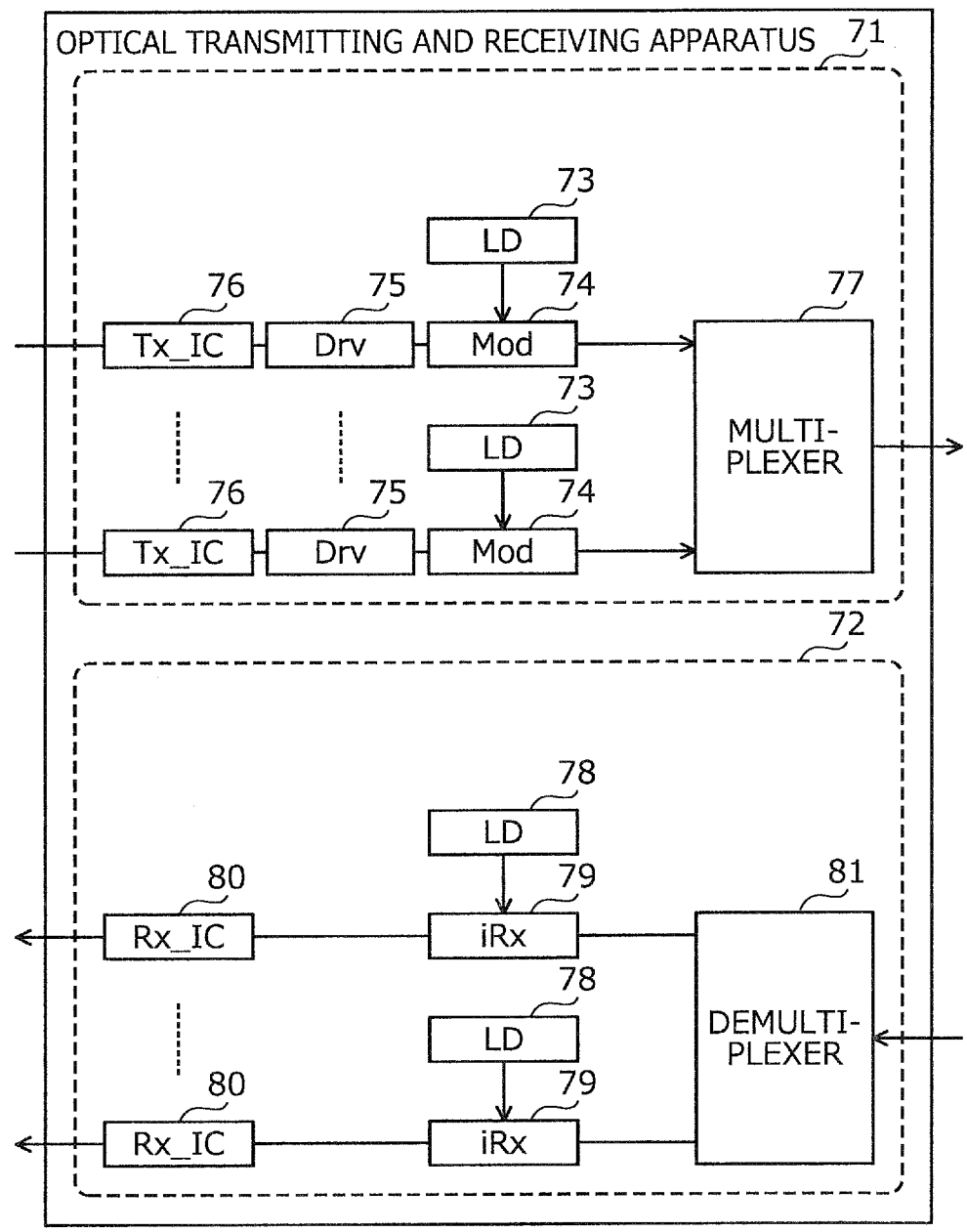
FIG. 8 is a diagram of an example of the optical transmitting and receiving apparatus according to the embodiment.

FIG. 8 is a diagram of an example of the optical transmitting and receiving apparatus according to the embodiment. As depicted in FIG. 8, the optical transmitting and receiving apparatus includes an optical transmitting apparatus 71 and an optical receiving apparatus 72.

The optical transmitting apparatus 71 includes a light emitting element (LD) 73, an optical modulator (Mod) 74, a modulator driving circuit (Drv) 75, and a transmission signal processing circuit (Tx_IC) 76 for each of plural different wavelengths; and also includes a multiplexer 77 that couples the signal light of the different wavelengths and that outputs wavelength multiplexed light. The light emitting element 73, the optical modulator 74, the modulator driving circuit 75, and the transmission signal processing circuit 76 are respectively same as the light emitting element 64, the optical modulator 65, the modulator driving circuit 66, and the integrated circuit 63 in the optical transmitter and receiver module depicted in FIG. 7.

The optical receiving apparatus 72 includes a local oscillation light source (LD) 78, an integrated receiver (iRx) 79, and a received signal processing circuit (Rx_IC) 80 for each of the plural different wavelengths; and also includes a demultiplexer 81 that separates the received wavelength multiplexed light into signal light of the respective wavelengths. The local oscillation light 78, the integrated receiver 79, and the received signal processing circuit 80 are respectively same as the local oscillation light source 69, the integrated receiver 70, and the integrated circuit 63 in the optical transmitter and receiver module depicted in FIG. 7.

According to the optical transmitting and receiving apparatus depicted in FIG. 8, similar to the optical receiving apparatus depicted in FIG. 1 or 2, or the optical receiving apparatus including the light blocking structure depicted in any one of FIGS. 4 to 6, any effects of the cross talk light generated by the locally oscillated light on the signal-light-level monitoring light receiving element can be suppressed. Thus, the level of the signal light can be measured with high accuracy.

According to the optical receiving apparatus, the optical transmitter and receiver module, and the optical transmitting and receiving apparatus enable the effects of the cross talk light generated by the locally oscillated light on the light receiving element for monitoring the signal light level to be suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical receiving apparatus comprising:
    an optical waveguide substrate in which optical waveguides configured to transmit signal light and locally oscillated light therethrough, and optical 90-degree hybrid circuits configured to cause the signal light and the locally oscillated light to interfere with each other are formed;
    a plurality of signal light receiving elements configured to receive the interfering signal light and locally oscillated light;
    a signal-light-level monitoring light receiving element configured to receive light branched from the signal light before interference with the locally oscillated light; and
    a housing that accommodates the optical waveguide substrate, the plurality of signal light receiving elements, and the signal-light-level monitoring light receiving element, wherein
    the signal light and the locally oscillated light are input into the optical waveguides from a first end face of the optical waveguide substrate,
    the plurality of signal light receiving elements are disposed aligned on a side of a second end face that is opposite to the first end face of the optical waveguide substrate,
    the signal-light-level monitoring light receiving element is disposed on a side of a third end face or a fourth end face between the first end face and the second end face of the optical waveguide substrate and at a position closer to the first end face than to the second end face,
    the optical waveguide substrate reflects a portion of the light transmitted through an interior of the optical waveguide substrate and emitted from the second end face,
    a light blocking plate that is configured to block the light leaking from the optical waveguide substrate from entering into the signal-light-level monitoring light receiving element is disposed between the signal-light-level monitoring light receiving element and the third end face or the fourth end face on a side having the signal-light-level monitoring light receiving element disposed thereon of the optical waveguide substrate, and
    the light blocking plate has a pinhole formed therein that transmits the light branched from the signal light before the interference with the locally oscillated light.

2. The optical receiving apparatus according to claim 1, wherein each among the plurality of signal light receiving elements reflects a portion of the light from the optical waveguide substrate and input into the signal light receiving element.

3. The optical receiving apparatus according to claim 1, wherein
    the optical waveguide substrate is made from a glass-based material, and
    the light passing through an interior of the optical waveguide substrate leaks to an exterior of the optical waveguide substrate.

4. The optical receiving apparatus according to claim 1, wherein the signal-light-level monitoring light receiving element is uncovered by a light blocking carrier except a light receiving face thereof that faces the optical waveguide substrate.

5. The optical receiving apparatus according to claim 1, wherein the width of the pinhole is 100 μm or less and equal to or wider than a width of an optical waveguide configured to transmit the light branched from the signal light before the interference with the locally oscillated light.

6. An optical transmitter and receiver module comprising:
    an optical transmitting apparatus that includes:
        an optical receiving apparatus that includes:
            a local oscillation light source configured to emit locally oscillated light;
            an optical waveguide substrate in which optical waveguides configured to transmit signal light and the locally oscillated light therethrough, and optical 90-degree hybrid circuits configured to cause the signal light and the locally oscillated light to interfere with each other are formed;
            a plurality of signal light receiving elements configured to receive the interfering signal light and locally oscillated light;
            a signal-light-level monitoring light receiving element configured to receive light branched from the signal light before interference with the locally oscillated light; and
            a housing that accommodates the optical waveguide substrate, the plurality of signal light receiving elements, and the signal-light-level monitoring light receiving element, wherein
            the signal light and the locally oscillated light are input into the optical waveguides from a first end face of the optical waveguide substrate,
            the plurality of signal light receiving elements are disposed aligned on a side of a second end face that is opposite to the first end face of the optical waveguide substrate,
            the signal-light-level monitoring light receiving element is disposed on a side of a third end face or a fourth end face between the first end face and the second end face of the optical waveguide substrate and at a position closer to the first end face than to the second end face,
            the optical waveguide substrate reflects a portion of the light transmitted through an interior of the optical waveguide substrate and emitted from the second end face,
            a light blocking plate that is configured to block the light leaking from the optical waveguide substrate from entering into the signal-light-level monitoring light receiving element is disposed between the signal-light-level monitoring light receiving element and the third end face or the fourth end face on a side having the signal-light-level monitoring light receiving element disposed thereon of the optical waveguide substrate, and the light blocking plate has a pinhole formed therein that transmits the light branched from the signal light before the interference with the locally oscillated light;

a light emitting element configured to emit light; and an optical modulator configured to modulate the light emitted from the light emitting element.

7. An optical transmitting and receiving apparatus comprising:

a plurality of optical transmitting apparatuses that include:

a plurality of optical receiving apparatuses that include:

a demultiplexer configured to separate wavelength multiplexed light according to wavelength into signal light;

a plurality of local oscillation light sources configured to emit locally oscillated light of differing wavelengths;

an optical waveguide substrate in which an optical waveguide configured to transmit the signal light and the locally oscillated light, and optical waveguides configured to transmit signal light and locally oscillated light therethrough, and optical 90-degree hybrid circuits configured to cause the signal light and the locally oscillated light to interfere with each other are formed;

a plurality of signal light receiving elements configured to receive the interfering signal light and locally oscillated light;

a signal-light-level monitoring light receiving element configured to receive light branched from the signal light before interference with the locally oscillated light; and a housing that accommodates the optical waveguide substrate, the plurality of signal light receiving elements, and the signal-light-level monitoring light receiving element, wherein the signal light and the locally oscillated light are input into the optical waveguides from a first end face of the optical waveguide substrate, the plurality of signal light receiving elements are disposed aligned on a side of a second end face that is opposite to the first end face of the optical waveguide substrate, the signal-light-level monitoring light receiving element is disposed on a side of a third end face or a fourth end face between the first end face and the second end face of the optical waveguide substrate and at a position closer to the first end face than to the second end face, the optical waveguide substrate reflects a portion of the light transmitted through an interior of the optical waveguide substrate and emitted from the second end face, a light blocking plate that is configured to block the light leaking from the optical waveguide substrate from entering into the signal-light-level monitoring light receiving element is disposed between the signal-light-level monitoring light receiving element and the third end face or the fourth end face on a side having the signal-light-level monitoring light receiving element disposed thereon of the optical waveguide substrate, and the light blocking plate has a pinhole formed therein that transmits the light branched from the signal light before the interference with the locally oscillated light;

a light emitting element configured to emit light; and an optical modulator configured to modulate the light emitted from the light emitting element; and an optical coupler configured to couple the signal light of differing wavelengths output from the plurality of optical transmitting apparatuses.

* * * * *